(12) United States Patent
Arase et al.

(10) Patent No.: US 7,348,386 B2
(45) Date of Patent: Mar. 25, 2008

(54) PROCESS FOR PRODUCING FLUOROCOPOLYMER, FLUOROCOPOLYMER, AND MOLDED OBJECT

(75) Inventors: Takuya Arase, Settsu (JP); Masahiro Kondou, Settsu (JP); Kenji Ishii, Settsu (JP); Tadaharu Isaka, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 310 days.

(21) Appl. No.: 10/518,014

(22) PCT Filed: Jun. 16, 2003

(86) PCT No.: PCT/JP03/07615

§ 371 (c)(1),
(2), (4) Date: Dec. 14, 2004

(87) PCT Pub. No.: WO2004/007576

PCT Pub. Date: Jan. 22, 2004

(65) Prior Publication Data

US 2005/0245707 A1    Nov. 3, 2005

(30) Foreign Application Priority Data

Jun. 14, 2002 (JP) .............................. 2002-210257

(51) Int. Cl.
*C08F 12/30* (2006.01)
(52) U.S. Cl. ...................... 526/243; 526/206; 526/242; 526/247; 526/250; 526/254
(58) Field of Classification Search ................ 526/243, 526/242, 250, 254, 247, 206
See application file for complete search history.

(56) References Cited

U.S. PATENT DOCUMENTS

| 3,282,875 | A | * | 11/1966 | Connolly et al. | ............ 524/795 |
| 5,281,680 | A | * | 1/1994 | Grot | ............................ 526/243 |

FOREIGN PATENT DOCUMENTS

| EP | 0 606 842 A1 | | 7/1994 |
| EP | 606842 A1 | * | 7/1994 |
| GB | 1034197 | * | 6/1966 |
| JP | 41-7949 | | 4/1966 |
| JP | 41-7949 B1 | | 4/1966 |
| JP | 6-157609 | | 6/1994 |
| JP | 6-157609 A | | 6/1994 |
| JP | 6-157675 | | 6/1994 |
| JP | 6-157675 A | | 6/1994 |
| JP | 6-211933 | | 8/1994 |
| JP | 6-234816 | * | 8/1994 |
| JP | 6-322034 | | 11/1994 |
| JP | 6-322034 A | | 11/1994 |
| JP | 11-302394 | | 11/1999 |
| JP | 11-302394 A | | 11/1999 |
| WO | WO 94/17109 | | 8/1994 |
| WO | WO-2004/007576 A1 | * | 1/2004 |

OTHER PUBLICATIONS

International Search Report for PCT/JP03/07615 dated Oct. 28, 2003.

* cited by examiner

*Primary Examiner*—Peter D. Mulcahy
*Assistant Examiner*—Henry S. Hu
(74) *Attorney, Agent, or Firm*—Sughrue Mion, PLLC

(57) ABSTRACT

The present invention relates to a method for producing a fluorocopolymer which comprises a polymerization reaction of a fluorine-containing ethylenic monomer with a fluorovinyl ether derivative represented by the following general formula (I):

$$CF_2=CF-O-[CF_2CF(CF_3)O]_n-(CF_2)_m-A \quad (I)$$

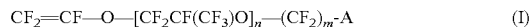

(wherein n represents an integer of 0 to 3, m represents an integer of 1 to 5, and A represents $-SO_2X$ or $-COOY$; X represents a halogen atom or $-NR^1R^2$; $R^1$ and $R^2$ are the same or different and each represents a hydrogen atom, an alkali metal, an alkyl group or a sulfonyl-containing group and Y represents a hydrogen atom or an alkyl group having 1 to 4 carbon atoms) to give a fluorocopolymer, said fluorine-containing ethylenic monomer being a perhaloethylenic monomer represented by the following general formula (II):

$$CF_2=CF-R_f^1 \quad (II)$$

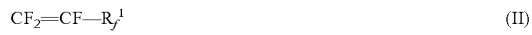

(wherein $R_f^1$ represents a fluorine atom, a chlorine atom, $R_f^2$ or $OR_f^2$; $R_f^2$ represents a straight or branched perfluoroalkyl group having 1 to 9 carbon atoms, which may have an ether oxygen atom(s)) and/or a hydrogen-containing fluoroethylenic monomer represented by the following general formula (III):

$$CHX^1=CFX^2 \quad (III)$$

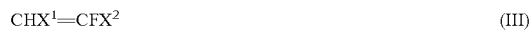

(wherein $X^1$ represents a hydrogen atom or a fluorine atom and $X^2$ represents a hydrogen atom, a fluorine atom, a chlorine atom, $R_f^3$ or $OR_f^3$; $R_f^3$ represents a straight or branched perfluoroalkyl group having 1 to 9 carbon atoms, which may have an ether oxygen atom(s)), and said polymerization reaction being carried out in a saturated perfluorohydrocarbon while additional feeding of the fluorine-containing ethylenic monomer and fluorovinyl ether derivative being carried out.

10 Claims, No Drawings

PROCESS FOR PRODUCING FLUOROCOPOLYMER, FLUOROCOPOLYMER, AND MOLDED OBJECT

TECHNICAL FIELD

The present invention relates to a method for producing a fluorocopolymer, to fluorocopolymers, and to molded articles.

BACKGROUND ART

Known as the methods of producing fluoropolymers with a high ion-exchange capacity by copolymerizing a fluorine-containing ethylenic monomer, such as $CF_2=CF_2$ and a monomer containing such a functional group as a halosulfonyl group are the bulk polymerization and solution polymerization techniques. In particular, the solution polymerization technique is in frequent and general use.

Japanese Kokai Publication Hei-06-234816 discloses, as an example of the solution polymerization technique, a method of polymerization which uses a hydrochlorofluorocarbon as the polymerization solvent. However, when this method of polymerization is carried out, the viscosity in the reaction system increases and, as a result, it becomes necessary to stop the reaction before satisfactory yields are obtained after the start of the reaction. Conversely, if attempts are made to produce high yields, there arises the problem that the composition distribution becomes wide, resulting in deterioration in moldability.

Japanese Kokai Publication Hei-06-211933 discloses a method of polymerization which comprises using perfluorocyclobutane as the polymerization solvent. However, it has no description about the polymerization of a monomer containing such a functional group as a halosulfonyl group.

In Japanese Kokai Publication Hei-06-322034, there is disclosed a method which comprises subjecting a halosulfonyl group-containing monomer to polymerization in such a non-telogen solvent as perfluoroheptane, perfluorodimethylcyclobutane or a like perfluoroalkane or perfluorocycloalkane. This method, however, seems to be such that all the monomers to be subjected to polymerization are charged into a reaction vessel at the time of starting the polymerization. Thus, it has a problem, namely the composition distribution tends to become wide when the content of the halosulfonyl group-containing monomer is low.

SUMMARY OF THE INVENTION

In view of the above-discussed state of the art, it is an object of the present invention to provide a method for producing a fluorocopolymer by which fluoropolymers can be obtained in high yields while suppressing the composition and/or molecular weight distribution.

The present invention relates to a method for producing a fluorocopolymer which comprises a polymerization reaction of a fluorine-containing ethylenic monomer with a fluorovinyl ether derivative represented by the following general formula (I):

$$CF_2=CF-O-[CF_2CF(CF_3)O]_n-(CF_2)_m-A \qquad (I)$$

(wherein n represents an integer of 0 to 3, m represents an integer of 1 to 5, and A represents $-SO_2X$ or $-COOY$; X represents a halogen atom or $-NR^1R^2$; $R^1$ and $R^2$ are the same or different and each represents a hydrogen atom, an alkali metal, an alkyl group or a sulfonyl-containing group and Y represents a hydrogen atom or an alkyl group having 1 to 4 carbon atoms) to give a fluorocopolymer, said fluorine-containing ethylenic monomer being a perhaloethylenic monomer represented by the following general formula (II):

$$CF_2=CF-R_f^1 \qquad (II)$$

(wherein $R_f^1$ represents a fluorine atom, a chlorine atom, $R_f^2$ or $OR_f^2$; $R_f^2$ represents a straight or branched perfluoroalkyl group having 1 to 9 carbon atoms, which may have an ether oxygen atom(s)) and/or a hydrogen-containing fluoroethylenic monomer represented by the following general formula (III):

$$CHX^1=CFX^2 \qquad (III)$$

(wherein $X^1$ represents a hydrogen atom or a fluorine atom and $X^2$ represents a hydrogen atom, a fluorine atom, a chlorine atom, $R_f^3$ or $OR_f^3$; $R_f^3$ represents a straight or branched perfluoroalkyl group having 1 to 9 carbon atoms, which may have an ether oxygen atom(s)) and, said polymerization reaction being carried out in a saturated perfluorohydrocarbon while additional feeding of said fluorine-containing ethylenic monomer and said fluorovinyl ether derivative being carried out.

In the following, the present invention is described in detail.

DETAILED DISCLOSURE OF THE INVENTION

The method for producing a fluorocopolymer according to the present invention comprises the polymerization reaction of the fluorovinyl ether derivative represented by the above general formula (I) to give a fluorocopolymer.

In the above general formula (I), A represents $-SO_2X$ or $-COOY$.

The above X represents a halogen atom or $-NR^1R^2$. The halogen atom may be any of a fluorine atom, a chlorine atom, a bromine atom and an iodine atom but preferably is a fluorine atom. $R^1$ and $R^2$ are the same or different and each represents a hydrogen atom, an alkali metal, an alkyl group or a sulfonyl-containing group. The alkyl group is not particularly restricted but may be a straight or branched alkyl group having 1 to 4 carbon atoms, such as a methyl group, an ethyl group, a propyl group or an isopropyl group. The above X is preferably a fluorine atom. The above Y represents a hydrogen atom or an alkyl group having 1 to 4 carbon atoms. The alkyl group represented by Y may be the same as the alkyl group mentioned above referring to $R^1$ and $R^2$. The sulfonyl-containing group is a sulfonyl group- and fluorine-containing alkyl group, for example a fluorine-containing alkylsulfonyl group, which may have a terminal substituent. As such, there may be mentioned $-SO_2R_f^4Z$ (wherein $R_f^4$ is a fluorine-containing alkylene group and Z is a univalent organic group), among others. As the above Z, there may be mentioned $SO_2F$, $SO_2(NHSO_2R_f^4SO_2)_nNHSO_2F$ (wherein $R_f^4$ is as defined above), etc.

In the above general formula (I), n represents an integer of 0 to 3, and is preferably 0 (zero). In the above general formula (I), m represents an integer of 1 to 5. Said m is preferably 2.

Preferably used as the above fluorovinyl ether derivative is one in which, in the above general formula (I), n is 0, m is 2 and A is $-SO_2F$.

The above fluorocopolymers are obtained by polymerizing the above fluorovinyl ether derivative preferably with a fluorine-containing ethylenic monomer.

The above-mentioned fluorine-containing ethylenic monomer is not particularly restricted but may be any of those fluorine atom- and vinyl group-containing monomers capable of being polymerized with the above-mentioned fluorovinyl ether derivative.

The fluorine-containing ethylenic monomer is not particularly restricted but includes, for example, perhaloethylenic monomers represented by the following general formula (II):

$$CF_2=CF-R_f^1 \quad (II)$$

(wherein $R_f^1$ represents a fluorine atom, a chlorine atom, $R_f^2$ or $OR_f^2$; $R_f^2$ represents a straight or branched perfluoroalkyl group having 1 to 9 carbon atoms, which may have an ether oxygen atom(s)) and hydrogen-containing fluoroethylenic monomers represented by the following general formula (III):

$$CHX^1=CFX^2 \quad (III)$$

(wherein $X^1$ represents a hydrogen atom or a fluorine atom and $X^2$ represents a hydrogen atom, a fluorine atom, a chlorine atom, $R_f^3$ or $OR_f^3$; $R_f^3$ represents a straight or branched perfluoroalkyl group having 1 to 9 carbon atoms, which may have an ether oxygen atom(s)).

The above fluorine-containing ethylenic monomer may comprise either one single species or two or more species.

Preferred as the fluorine-containing ethylenic monomer is at least one species selected from the group consisting of $CF_2=CF_2$, $CH_2=CF_2$, $CF_2=CFCl$, $CF_2=CFH$, $CH_2=CFH$, $CF_2=CFCF_3$ and fluorovinyl ethers represented by $CF_2=CF-O-R_f^6$ (wherein $R_f^6$ represents a fluoroalkyl group having 1 to 9 carbon atoms or a fluoropolyether group having 1 to 9 carbon atoms). In this case, the above-mentioned fluorovinyl ethers may be used either singly or two or more of them may be used. Preferred among the fluorovinyl ethers are those in which $R_f^6$ is a fluoroalkyl group having 1 to 3 carbon atoms.

Preferred as the fluorine-containing ethylenic monomer are perhaloethylenic monomers, in particular perfluoroethylenic monomers. More preferred is $CF_2=CF_2$.

In producing the above-mentioned fluorocopolymers, $CF_2=CF_2$ is preferably used as the fluorine-containing ethylenic monomer and, as the fluorovinyl ether derivative, one in which n is 0, m is 2 and A is $-SO_2F$ is preferably used.

The fluoropolymers may be those obtained by polymerizing, in addition to the fluorine-containing ethylenic monomer, a fluorine-free olefin containing no fluorine atom, such as ethylene, propylene, 1-butene, 2-butene, monochloroethylene, dichloroethylene, etc.

The fluorocopolymers may be produced by copolymerizing with a copolymerizable monomer other than the above-mentioned fluorine-free olefin for providing the fluorocopolymers with various functional properties. The other copolymerizable monomer is not particularly restricted but may be adequately selected from among copolymerizable monomers to achieve the purpose of controlling the rate of polymerization, controlling the polymer composition, controlling the mechanical properties such as elasticity modulus, or introducing crosslinking sites, for instance. As examples, there may be mentioned, among others, monomers having two or more unsaturated bonds, for example divinylbenzene, cyano group-containing monomers, and halogen-terminated monomers.

The fluorocopolymers are preferably obtained by the polymerization reaction of the above-mentioned fluorovinyl ether derivative preferably with the above-mentioned fluorine-containing ethylenic monomer.

The polymerization reaction is carried out in a saturated perfluorohydrocarbon.

The saturated perfluorohydrocarbon is one derived from substitution of all hydrogen atoms of a saturated hydrocarbon with fluorine atoms.

The saturated perfluorohydrocarbon preferably has 20 or less than 20 carbon atoms. A more preferred upper limit is 10, a still more preferred upper limit is 7, and a preferred lower limit is 3.

The saturated perfluorohydrocarbon may have a cyclic structure and/or a linear structure and preferably is a perfluoroalkane or a perfluorocycloalkane. The saturated perfluorohydrocarbon having a cyclic structure and/or a linear structure each optionally with a branched structure, although it is preferably one without a branched structure. The saturated perfluorohydrocarbons having 20 or less than 20 carbon atoms and having a cyclic structure or a linear structure are preferred.

The affinity of the above-mentioned saturated perfluorohydrocarbon for the fluorocopolymers mentioned above is generally not so high. This low affinity results from the fact that the saturated perfluorohydrocarbon is generally nonpolar while the fluorocopolymers have a sulfonic acid group or a carboxyl group, or a derivative of such hydrophilic group.

The saturated perfluorohydrocarbon is preferably low in solubility or swellability of the fluorocopolymers. Such saturated perfluorohydrocarbon is not particularly restricted but includes, among others, perfluorohexane, perfluoroheptane, perfluorocyclobutane, and perfluorodimethylcyclobutane. Preferred as the saturated perfluorohydrocarbon are perfluorohexane and perfluorocyclobutane, however.

The polymerization reaction is carried out while additional feeding of the fluorovinyl ether derivative is carried out.

The phrase "additional feeding" as used herein means that the whole amount of a monomer to be subjected to polymerization is not allowed to exist in the reaction system at the time of starting the polymerization but at least part of the feed is added to the reaction system intermittently or continuously after the start of polymerization.

The above polymerization reaction is generally carried out while additional feeding of the fluorovinyl ether derivative and the fluorine-containing ethylenic monomer is carried out.

By carrying out the above additional feeding, it becomes possible to maintain the concentration ratio between the fluorine-containing ethylenic monomer and the fluorovinyl ether derivative (hereinafter referred to as "monomer concentration ratio") in the reaction system at a constant or almost constant level. When the monomer concentration ratio is maintained constant or almost constant, a fluorocopolymer whose polymer chains are the same or close in composition and/or molecular weight one another can be produced.

The above polymerization reaction can be carried out in the conventional manner except that additional feeding is carried out as mentioned above. The polymerization reaction is preferably carried out in the manner of solution polymerization so that the effects of the present invention due to the low affinity of the saturated perfluorohydrocarbon for the fluorocopolymers.

The fluorocopolymers produced by the above-mentioned method for producing a fluorocopolymer also constitute an aspect of the present invention.

The fluorocopolymers are preferably ones satisfying the following relations (a1) and (b):

$$0 \leq \Delta H \leq 6.4 - 0.48C (5 \leq C \leq 13) \quad \text{(a1)}$$

$$0 \leq \Delta H \leq 0.2 (13 < C \leq 18) \quad \text{(b)}$$

where ΔH is the heat of fusion (in J/g) as appearing at 315 to 325° C. upon measurement with a differential scanning calorimeter [DSC] and C is the fluorovinyl ether derivative unit content (in mole percent) in the fluorocopolymer.

As for the above relation (a1), the following relation is more preferred:

$$0 \leq \Delta H \leq 6.375 - 0.475C (5 \leq C \leq 13) \quad \text{(a).}$$

The "fluorovinyl ether derivative unit content C" so referred to herein means the proportion of the number of moles $[N_1]$ of the fluorovinyl ether derivative from which the fluorovinyl ether derivative unit is derived relative to the number of moles $[N]$ of the monomers from which all the monomer units in the molecules of the fluorocopolymer are derived, namely the mean value of the content $C_N$ represented by $$C_N(\%) = (N_1/N) \times 100.$$

The fluorovinyl ether derivative unit content C is the value obtained by infrared absorption spectroscopy [IR] or by fused state NMR at 300° C.

The term "monomer unit" as used herein means a part derived from the relevant monomer in the molecular structure of such a fluorocopolymer as mentioned above. The term "all monomer units" means all the parts derived from the monomers in the molecular structure of the fluorocopolymer. Therefore, the "monomers derived from all monomer units" constitute the whole amount of the monomers that have become the constituents of the fluorocopolymer.

The term "fluorovinyl ether derivative unit" as used herein means a part derived from the corresponding fluorovinyl ether derivative in the molecular structure of the fluorocopolymer. In the fluorocopolymer, the fluorovinyl ether derivative unit may have the same A as the A in the above general formula (I) before polymerization or a modified form thereof. As the modified form of A, there may be mentioned, for example, an ionizable functional group. As the ionizable functional group, there may be mentioned, for example, $-SO_3M^1$ or $-SO_3M^2{}_{1/2}$ ($M^1$ representing an alkali metal and $M^2$ representing an alkaline earth metal atom) derived from $-SO_2X^3$ ($X^3$ representing a halogen atom) by the action of an alkali, and $-SO_3H$ further formed therefrom by the action of an acid.

The heat of fusion ΔH can serve as an indicator in making a judgment as to whether the fluorocopolymer obtained is a homogeneous polymer or a heterogeneous polymer.

The term "homogeneous" as used herein referring to the above-mentioned homogeneous polymer means (1) the state in which there are no or few sites of uneven fluorovinyl ether derivative unit distribution in each polymer chain and/or (2) the state in which the disparities in fluorovinyl ether derivative unit content $C_N$ and/or molecular weight among the polymer chains are small.

The term "heterogeneous" as used herein referring to the above-mentioned heterogeneous polymer means (3) the state in which there are sites poor in fluorovinyl ether derivative units and sites rich therein in each polymer chain and/or (4) the state in which there are the disparities in fluorovinyl ether derivative unit content $C_N$ and/or molecular weight among the polymer chains. When the term "heterogeneous" is simply used, the purport thereof includes the above-mentioned states (3) and (4).

In the above-mentioned heterogeneous polymer, those sites poor in fluorovinyl ether derivative units or those polymer chains having a low fluorovinyl ether derivative unit content $C_N$ tend to serve as causes of crystallization. The sites of such crystallization (hereinafter referred to as "crystallization sites") require greater quantities of heat for fusion and, therefore, it is presumable that the above-mentioned heat of fusion ΔH increase beyond the ranges defined by the relations (a) and (b). On the other hand, in the case of the above-mentioned homogeneous polymer, the fluorovinyl ether derivative unit is distributed uniformly or almost uniformly in each polymer chain, so that such crystallization sites as mentioned above are hardly formed, hence, presumably, the quantity of heat required for fusion falls within the ranges defined by the relations (a) and (b).

When the heat of fusion ΔH of the fluorocopolymer is within the above ranges, estimably, the fluorovinyl ether derivative and the fluorine-containing ethylenic monomer are uniformly or almost uniformly polymerized in each polymer chain of the fluorocopolymer and that the disparities in fluorovinyl ether derivative unit content $C_N$ and/or molecular weight among the polymer chains of the fluorocopolymer are small; hence the composition distribution and/or molecular weight distribution is estimated to be limited.

The heat of fusion ΔH is preferably measured when the fluorovinyl ether derivative unit content C is within the range of 5 to 18 mole percent, as shown hereinabove referring to the relations (a) and (b). For producing the fluorocopolymer having the fluorovinyl ether derivative unit content C of which exceeds 18 mole percent, it is necessary to increase the fluorovinyl ether derivative concentration in the reaction system; the fluorovinyl ether derivative unit content $C_N$ is not likely to occur disparities and such a heterogeneous polymer as mentioned above is hardly formed. However, the molded articles finally obtained are poor in mechanical strength. On the other hand, the fluorovinyl ether derivative unit content C is preferably not lower than 5 mole percent so that the fluorocopolymer may be obtained as a homogeneous polymer with ease while retaining the mechanical strength thereof to prevent its functions at a use as electrolyte membranes or ion exchange membranes from deteriorating.

The mechanisms of polymerization by which the fluorocopolymer can be produced as such homogeneous polymer as mentioned above are not fully clear but can be considered as follows. Thus, the conventional methods use a solvent capable of dissolving or swelling the polymer chains resulting from polymerization of the fluorovinyl ether derivative, so that the polymerization proceeds without precipitation of the fluorocopolymer in the reaction mixture solution, hence the viscosity increases. The viscosity increase brings about not only a decrease in yield which results from the stopping of stirring due to the increase in torque during polymerization but also inequalities in monomer, polymerization initiator and chain transfer agent concentrations in the reaction mixture solution, in diffusion coefficient of radicals during polymerization, and in physical properties such as heat transfer rate and heat release rate, among others, in the reaction mixture solution. Such environmental disparities in concentrations and physical properties presumably give rise to at least two reaction fields showing great disparities in copolymer molecule composition and molecular weight between one reaction field and the other reaction field. Further, when, in carrying out the conventional methods, all the raw materials are charged at once at the time of starting the polymerization, the monomer concentration ratio varies as the polymerization reaction proceeds; this change is considered to be one of the causes of the formation of a copolymer showing high distributions in its composition and its molecular weight.

In accordance with the method for producing a fluorocopolymer according to the present invention, the polymerization reaction is carried out in a saturated perfluorohydrocarbon showing low affinity for the fluorovinyl ether derivative and, therefore, the fluorocopolymer obtained is low in solubility or swellability and readily precipitate out, hence the viscosity of the reaction solution will not increase. Therefore, supposedly, the concentrations of monomers, polymerization initiator, chain transfer agent and so forth, the heat transfer rate and heat release rate and other factors in the reaction mixture are maintained constant or almost constant and the polymerization reaction thus can proceed in one polymerization field. Further, it is considered that the effects of the additional feeding carried out for minimizing the change in monomer concentration ratio are additionally produced, with the result that fluorocopolymers whose composition distribution and molecular weight distribution are minimized can be obtained in high yields.

The polymerization reaction in the method for producing a fluorocopolymer according to the present brings the mass of the fluorocopolymer relative a volume (liter) of a polymerization solution (hereinafter sometimes referred to as "polymer yield") to arrive at 30 g/L or higher level. Since, in the above polymerization reaction, the viscosity of the reaction solution will not increase, as mentioned above, the polymer yield can arrive at such a high level as 30 g/L or above and, even when the polymer yield becomes so high, the composition distribution and molecular weight distribution can be minimized. The effects of the present invention are produced more significantly, in particular, in the process of polymerization after arrival of the polymer yield at 30 g/L or above.

The term "polymerization solution" as used herein means the solution to be used in the above polymerization reaction either in the course of the polymerization reaction or after completion of the polymerization reaction. The polymerization solution does not contain the fluorocopolymer but contains the saturated perfluorohydrocarbon as well as the fluorine-containing ethylenic monomer, fluorovinyl ether derivative and polymerization initiator, together with a further additive(s), if necessary.

If the heat of fusion ΔH thereof is within the above-specified ranges, the fluorocopolymer of the present invention, when molded at molding temperatures generally employed for fluororesins, namely at temperatures not higher than 300° C., leaves no unmelted residues and gives molded articles without impairing the appearance thereof, hence can be said to be excellent in moldability.

The molded articles formed from the above fluorocopolymer also constitute an aspect of the present invention.

The term "molded articles" as used herein includes, within the concept thereof, molded articles obtained by the fusion molding, casting or impregnation method or a like technique and thus includes films, inclusive of thin films, coatings and so forth.

The fusion molding method comprises heating the fluorocopolymer to a temperature not lower than the melting point thereof and molding/processing the melt by such means as pressing or extrusion. The casting method generally comprises dissolving the fluorocopolymer in a fluorine-containing solvent or some other solvent such as an alcohol/water mixed solvent, applying the resulting solution, if necessary supplemented with a film-forming auxiliary, to a substrate such as a glass sheet, drying and peeling off the coat film obtained from the substrate. The impregnation method comprises impregnating a substrate, such as a fibrous material (e.g. glass fiber, carbon fiber) or a woven fabric made thereof or a porous substance, in a solution of the fluorocopolymer in a fluorine-containing solvent or such a solvent as an alcohol/water mixed solvent, followed by drying. In the case of producing self-supporting films, the molded articles are preferably obtained by the above-mentioned impregnation method.

The above-mentioned molded articles preferably forms films. The films are preferably uniform or almost uniform in thickness since those portions of the films of less thickness tend to become foci of stress concentration, hence susceptible to breakage. The films preferably have a thickness of 10 to 200 μm. The molded articles preferably have smoothness so that they may show improved appearance and aesthetic properties.

In the above molded articles, if desired, the forms are available in which A in the above general formula (I) have been converted to an ionizable functional group. As the ionizable functional group, there may be mentioned, among others, those mentioned hereinabove referring to the fluorovinyl ether derivative unit. The molded articles having such a ionizable functional group, in particular when in the form of membranes, can be used as electrolyte membranes, ion exchange membranes and the like. The molded articles of the present invention can be used as electrolyte membranes or ion exchange membranes, for example as membranes for electrolytes, membranes in lithium cells, membranes for brine electrolysis, membranes for water electrolysis, membranes for hydrogen halide electrolysis, membranes for oxygen concentrators, membranes for humidity sensors, membranes for gas sensors, etc.

The above molded articles can be used adequately for a prolonged period of time even in solid polyelectrolyte type fuel cells which are generally used under severe conditions.

BEST MODES FOR CARRYING OUT THE INVENTION

The following examples illustrate the present invention in further detail. These examples are, however, by no means limitative of the scope of the present invention.

In Example 1 to 4 and Comparative Examples 1 to 3, the differential scanning calorimetric measurements were carried out under the following conditions.
Measuring apparatus: Shimadzu DSC-50
Temperature programming: 10° C./min
Measurement temperature range: 130 to 350° C.
Sample size: About 10 mg.

EXAMPLE 1

A 500-mL SUS stainless steel autoclave was charged with 227.5 g of perfluorocyclobutane as a solvent, and 168.2 g of perfluoro(ethyl vinyl ether)sulfonyl fluoride (PFSF, $CF_2$=$CFOCF_2CF_2SO_2F$), followed by deaeration. With stirring at 800 rpm and at a temperature of 30° C., tetrafluoroethylene [TFE] was charged into the autoclave under pressure to a total pressure of 0.33 MPa and, then, 3.56 g of a 8% (by mass) solution of the initiator di(ω-hydroperfluorohexanoyl) peroxide in perfluorohexane was fed under pressure to initiate the polymerization reaction. During the reaction, TFE was introduced from outside the system to maintain the pressure at a constant level while a total of 7.0 g of PFSF was intermittently fed under pressure to compensate for the portion consumed in the reaction. Two hours later, the unreacted TFE was discharged out of the system and the polymerization reaction was thus terminated. The polymer concentration in the liquid reaction mixture obtained was 87 g/L, and the stirring condition within the system was good. After completion of the polymerization reaction, 250 mL of chloroform was added, followed by 30 minutes of stirring. Then, solid-liquid separation was effected using a centrifugal separator, and 250 mL of chloroform was added to the solid matter, followed by 30 minutes of stirring. This procedure was repeated three times to wash the polymer. Then, the thus-washed polymer was deprived of the residual chloroform under vacuum at 120° C. to give 21.8 g of copolymer a.

The fluorovinyl ether derivative content C in the thus-obtained copolymer a as estimated by fused state NMR at 300° C. was 16.2 mole percent, the melt flow rate [MFR] at 270° C. under a load of 0.21 MPa was 6 g/10 minutes, and the fusion peak area in DSC as observed at about 320° C. was 0.0 J/g.

EXAMPLE 2

A 500-mL SUS stainless steel autoclave was charged with 266.4 g of perfluorohexane as a solvent, and 166.4 g of PFSF, followed by deaeration. With stirring at 800 rpm and at a temperature of 30° C., TFE was charged into the autoclave under pressure to a total pressure of 0.38 MPa and, then, 3.56 g of a 8% (by mass) solution of the initiator di(ω-hydroperfluorohexanoyl) peroxide in perfluorohexane was fed under pressure to initiate the polymerization reaction. During the reaction, TFE was introduced from outside the system to maintain the pressure at a constant level while a total of 7.7 g of PFSF was intermittently fed under pressure to compensate for the portion consumed in the reaction. After the lapse of 2.3 hours, the unreacted TFE was discharged out of the system and the polymerization reaction was thus terminated. The polymer concentration in the liquid reaction mixture obtained was 84 g/L, and the stirring condition within the system was good. After completion of the polymerization reaction, 250 mL of chloroform was added, followed by 30 minutes of stirring. Then, solid-liquid separation was effected using a centrifugal separator, and 250 mL of chloroform was added to the solid matter, followed by 30 minutes of stirring. This procedure was repeated three times to wash the polymer. Then, the thus-washed polymer was deprived of the residual chloroform under vacuum at 120° C. to give 20.9 g of copolymer b.

The fluorovinyl ether derivative content C in the thus-obtained copolymer b as estimated by fused state NMR at 300° C. was 15.9 mole percent, the MFR at 270° C. under a load of 0.21 MPa was 14.4 g/10 minutes, and the fusion peak area in DSC as observed at about 320° C. was 0.0 J/g.

EXAMPLE 3

A 500-mL SUS stainless steel autoclave was charged with 148.3 g of perfluorodimethylcyclobutane as a solvent, and 100.3 g of PFSF, followed by deaeration. With stirring at 800 rpm and at a temperature of 30° C., TFE was charged into the autoclave under pressure to a total pressure of 0.39 MPa and, then, 2.15 g of a 6.8% (by mass) solution of the initiator di(ω-hydroperfluorohexanoyl) peroxide in perfluorohexane was fed under pressure to initiate the polymerization reaction. During the reaction, TFE was introduced from outside the system to maintain the pressure at a constant level while a total of 4.3 g of PFSF was intermittently fed under pressure to compensate for the portion consumed in the reaction. An hour and half later, the unreacted TFE was discharged out of the system and the polymerization reaction was thus terminated. The polymer concentration in the liquid reaction mixture obtained was 89 g/L, and the stirring condition within the system was good. After completion of the polymerization reaction, 250 mL of chloroform was added, followed by 30 minutes of stirring. Then, solid-liquid separation was effected using a centrifugal separator, and 250 mL of chloroform was added to the solid matter, followed by 30 minutes of stirring. This procedure was repeated three times to wash the polymer. Then, the thus-washed polymer was deprived of the residual chloroform under vacuum at 120° C. to give 22.3 g of copolymer c.

The fluorovinyl ether derivative content C in the thus-obtained copolymer c as estimated by fused state NMR at 300° C. was 15.5 mole percent, the MFR at 270° C. under a load of 0.21 MPa was 8 g/10 minutes, and the fusion peak area in DSC as observed at about 320° C. was 0.0 J/g.

EXAMPLE 4

A 100-mL SUS stainless steel autoclave was charged with 43 g of perfluorocyclobutane as a solvent, and 11.4 g of PFSF, followed by deaeration. With stirring at 1.000 rpm and at a temperature of 30° C., TFE was charged into the autoclave under pressure to a total pressure of 0.71 MPa and, then, 1.0 g of a 8% (by mass) solution of the initiator di(ω-hydroperfluorohexanoyl) peroxide in perfluorohexane was fed under pressure to initiate the polymerization reaction. During the reaction, TFE was introduced from outside the system to maintain the pressure at a constant level while a total of 0.5 g of PFSF was intermittently fed under pressure to compensate for the portion consumed in the reaction. After the lapse of 3.2 hours, the unreacted TFE was discharged out of the system and the polymerization reaction was thus terminated. The polymer concentration in the liquid reaction mixture obtained was 124 g/L, and the stirring condition within the system was good. After completion of the polymerization reaction, 250 mL of chloroform was added, followed by 30 minutes of stirring. Then, solid-liquid separation was effected using a centrifugal separator, and 250 mL of chloroform was added to the solid matter, followed by 30 minutes of stirring. This procedure was repeated three times to wash the polymer. Then, the thus-washed polymer was deprived of the residual chloroform under vacuum at 120° C. to give 4.4 g of copolymer d.

The fluorovinyl ether derivative content C in the thus-obtained copolymer d as estimated by fused state NMR at 300° C. was 5.5 mole percent, and the fusion peak area in DSC as observed at about 320° C. was 2.7 J/g.

COMPARATIVE EXAMPLE 1

A 500-mL SUS stainless steel autoclave was charged with 257.8 g of a mixture of $CF_3CClFCClFCF_3$ and $CClF_2CClFCF_2CF_3$ as a solvent, and 167.4 g of PFSF, followed by deaeration. With stirring at 800 rpm and at a temperature of 30° C., TFE was charged into the autoclave under pressure to a total pressure of 0.39 MPa and, then, 3.56 g of a 8% (by mass) solution of the initiator di(ω-hydroperfluorohexanoyl) peroxide in perfluorohexane was charged under pressure to initiate the polymerization reaction. During the reaction, TFE was introduced from outside the system to maintain the pressure at a constant level while a total of 7.6 g of PFSF was intermittently fed under pressure to compensate for the portion consumed in the reaction. An hour later, the unreacted TFE was discharged out of the system and the polymerization reaction was thus terminated. The polymer concentration in the liquid reaction mixture obtained was 79 g/L, and the stirring condition within the system was good. After completion of the polymerization reaction, 250 mL of perfluorohexane was added, followed by 30 minutes of stirring. Then, solid-liquid separation was effected using a centrifugal separator, and 250 mL of perfluorohexane was added to the solid matter, followed by 30 minutes of stirring. This procedure was repeated three times to wash the polymer. Then, the thus-washed polymer was deprived of the residual perfluorohexane under vacuum at 120° C. to give 19.8 g of copolymer e.

The fluorovinyl ether derivative content C in the thus-obtained copolymer e as estimated by fused state NMR at 300° C. was 14.6 mole percent, the MFR at 270° C. under a load of 0.21 MPa was 0.95 g/10 minutes, and the fusion peak area in DSC as observed at about 320° C. was 0.30 J/g.

COMPARATIVE EXAMPLE 2

A 500-mL SUS stainless steel autoclave was charged with 255.5 g of $CHF_2CF_2CF_2CF_2CF_2Cl$ as a solvent, and 166.4 g of PFSF, followed by deaeration. With stirring at 800 rpm and at a temperature of 30° C., TFE was charged into the autoclave under pressure to a total pressure of 0.39 MPa and, then, 3.56 g of a 8% (by mass) solution of the initiator di (ω-hydroperfluorohexanoyl) peroxide in perfluorohexane was fed under pressure to initiate the polymerization reaction. During the reaction, TFE was introduced from outside the system to maintain the pressure at a constant level while a total of 7.5 g of PFSF was intermittently fed under pressure to compensate for the portion consumed in the reaction. After the lapse of 1.2 hours, the unreacted TFE was discharged out of the system and the polymerization reaction was thus terminated. The polymer concentration in the liquid reaction mixture obtained was 91 g/L, and the stirring condition within the system was good. After completion of the polymerization reaction, 250 mL of chloroform was added, followed by 30 minutes of stirring. Then, solid-liquid separation was effected using a centrifugal separator, and 250 mL of chloroform was added to the solid matter, followed by 30 minutes of stirring. This procedure was repeated three times to wash the polymer. Then, the thus-washed polymer was deprived of the residual chloroform under vacuum at 120° C. to give 22.7 g of copolymer f.

The fluorovinyl ether derivative content C in the thus-obtained copolymer f as estimated by fused state NMR at 300° C. was 13.7 mole percent, the MFR at 270° C. under a load of 0.21 MPa was 1.3 g/10 minutes, and the fusion peak area in DSC as observed at about 320° C. was 0.35 J/g.

COMPARATIVE EXAMPLE 3

A 100-mL SUS stainless steel autoclave was charged with 43 g of a mixture of $CF_3CClFCClFCF_3$ and $CClF_2CClFCF_2CF_3$ as a solvent, and 11.4 g of PFSF, followed by deaeration. With stirring at 1,000 rpm and at a temperature of 30° C., TFE was charged into the autoclave under pressure to a total pressure of 0.47 MPa and, then, 1.0 g of a 8% (by mass) solution of the initiator di(ω-hydroperfluorohexanoyl) peroxide in perfluorohexane was charged under pressure to initiate the polymerization reaction. During the reaction, TFE was introduced from outside the system to maintain the pressure at a constant level while a total of 0.5 g of PFSF was intermittently fed under pressure to compensate for the portion consumed in the reaction. After the lapse of 2.2 hours, the unreacted TFE was discharged out of the system and the polymerization reaction was thus terminated. The polymer concentration in the liquid reaction mixture obtained was 152 g/L. After completion of the polymerization reaction, 250 mL of chloroform was added, followed by 30 minutes of stirring. Then, solid-liquid separation was effected using a centrifugal separator, and 250 mL of chloroform was added to the solid matter, followed by 30 minutes of stirring. This procedure was repeated three times to wash the polymer. Then, the thus-washed polymer was deprived of the residual chloroform under vacuum at 120° C. to give 4.9 g of copolymer h.

The fluorovinyl ether derivative content C in the thus-obtained copolymer h as estimated by fused state NMR at 300° C. was 6.5 mole percent, and the fusion peak area in DSC as observed at about 320° C. was 3.8 J/g.

INDUSTRIAL APPLICABILITY

The method for producing a fluorocopolymer according to the present invention, which has the above-described constitution, can produce fluorocopolymers in high yields while minimizing the composition and/or molecular weight distribution.

The invention claimed is:
1. A method for producing a fluorocopolymer which comprises a polymerization reaction of a fluorine-containing ethylenic monomer with at least one fluorovinyl ether derivative represented by the following general formula (I):

$$CF_2=CF-O-[CF_2CF(CF_3)O]_n-(CF_2)_m-A \qquad (I)$$

(wherein n represents an integer of 0 to 3, m represents an integer of 1 to 5, and A represents $-SO_2X$ or $-COOY$; X represents a halogen atom or $-NR^1R^2$; $R^1$ and $R^2$ are the same or different and each represents a hydrogen atom, an alkali metal, an alkyl group or a sulfonyl-containing group and Y represents a hydrogen atom or an alkyl group having 1 to 4 carbon atoms) to give a fluorocopolymer, said fluorine-containing ethylenic monomer being a perhaloethylenic monomer represented by the following general formula (II):

$$CF_2=CF-R_f^1 \qquad (II)$$

(wherein $R_f^1$ represents a fluorine atom, a chlorine atom, $R_f^2$ or $OR_f^2$; $R_f^2$ represents a straight or branched perfluoroalkyl group having 1 to 9 carbon atoms, which may have an ether oxygen atom(s)) and/or a hydrogen-containing fluoroethylenic monomer represented by the following general formula (III):

$$CHX^1=CFX^2 \qquad (III)$$

(wherein $X^1$ represents a hydrogen atom or a fluorine atom and $X^2$ represents a hydrogen atom, a fluorine atom, a chlorine atom, $R_f^3$ or $OR_f^3$; $R_f^3$ represents a straight or branched perfluoroalkyl group having 1 to 9 carbon atoms, which may have an ether oxygen atom(s)) and said polymerization reaction being carried out in a saturated perfluorohydrocarbon while additional feeding of said fluorine-containing ethylenic monomer and said fluorovinyl ether derivative being carried out with the condition that the concentration ratio between the fluorine-containing ethylenic monomer and the fluorovinyl ether derivative in the reaction system is maintained at a constant or almost constant level so that a fluoropolymer is produced with minimized composition distribution and molecular weight distribution.

2. The method for producing a fluorocopolymer according to claim 1,
wherein the polymerization reaction brings a mass of the fluorocopolymer relative to a volume of a polymerization solution to arrive at 30 g/L or a higher level.

3. The method for producing a fluorocopolymer according to claim 1,
wherein the saturated perfluorohydrocarbon has 20 or less than 20 carbon atoms and has a cyclic structure or linear structure each optionally with a branched structure.

4. The method for producing a fluorocopolymer according to claim 1,
wherein the saturated perfluorohydrocarbon is a perfluorohexane or a perfluorocyclobutane.

5. The method for producing a fluorocopolymer according to claim 1,
wherein the fluorine-containing ethylenic monomer is $CF_2=CF_2$, and wherein the fluorovinyl ether derivative represented by general formula (I) is $CF_2=CF-O-CF_2CF_2-SO_2F$.

6. A fluorocopolymer produced by the method for producing a fluorocopolymer according to claim 1.

7. The fluorocopolymer according to claim 6
which satisfies the following relations (a) and (b):

$$0 \leq \Delta H \leq 6.375 - 0.475 C (5 \leq C \leq 13) \tag{a}$$

$$0 \leq \Delta H \leq 0.2 (13 < C \leq 18) \tag{b}$$

where $\Delta H$ is a heat of fusion (in J/g) as appearing at 315 to 325° C. upon measurement with a differential scanning calorimeter and C is a fluorovinyl ether derivative unit content (in mole percent) in the fluorocopolymer.

8. A molded article formed from the fluorocopolymer according to claim 6.

9. The molded article according to claim 8, which forms a membrane.

10. A solid polyelectrolyte fuel cell comprising the molded article according to claim 8.

* * * * *